United States Patent [15] 3,694,996
Carlsen [45] Oct. 3, 1972

[54] INSTALLATION FOR THE FILLING OF PALLETS WITH FRUIT OR OTHER EASILY DAMAGED PRODUCTS

[72] Inventor: Earl W. Carlsen, Yakima, Wash.
[73] Assignee: Food Industries Research & Engineering, Inc., Yakima, Wash.
[22] Filed: Nov. 20, 1970
[21] Appl. No.: 91,287

[52] U.S. Cl. ..........................53/35, 53/59, 53/248, 141/198
[51] Int. Cl. ..........................B65b 5/06, B65b 57/14
[58] Field of Search ........53/35, 52, 59, 248; 73/149, 73/194 R; 137/410, 428; 141/192, 198, 199

[56] References Cited

UNITED STATES PATENTS 3,470,670  10/1969  Gorin ...........................53/35
3,178,867   4/1965  Martin .........................53/248
3,550,347  12/1970  Coates ......................53/248 X Primary Examiner—Robert L. Spruill
Attorney—Buckhorn, Blore, Klarquist & Sparkman

[57] ABSTRACT

The installation comprises a roller bed 2 for pallets 1 passing beneath a fruit feed unit 4 to a position called the filling point 3; a tank-forming arrangement of liquid-tight partitions positioned around the filling point, some of which at least, are movable and may selectively occupy either an operative position in which they laterally close the filling point, or a nonoperative position in which, on the other hand, they permit passage of the pallets; means for placing a predetermined quantity of liquid in the tank; means for rapidly, continuously flowing fruit into the tank to overflow the tank; means for placing a predetermined fraction of the overflowed liquid into a metering column; means responsive to height of liquid in the column to stop the flowing of fruit into the tank; and means for rapidly emptying the tank of said liquid.

8 Claims, 5 Drawing Figures

3,694,996

EARL W. CARLSEN
INVENTOR

BY
BUCKHORN, BLORE, KLARQUIST & SPARKMAN
ATTORNEYS

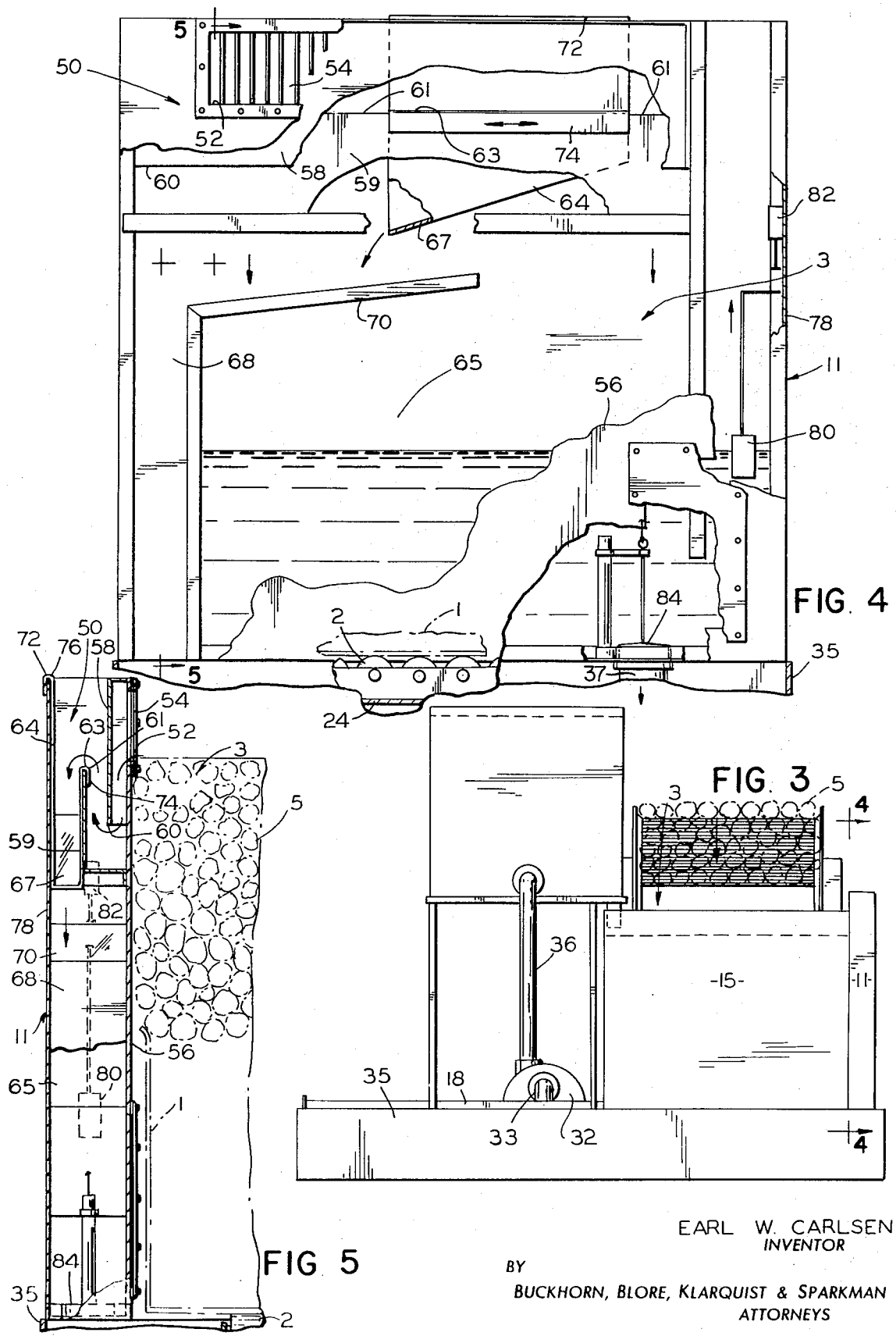

INSTALLATION FOR THE FILLING OF PALLETS WITH FRUIT OR OTHER EASILY DAMAGED PRODUCTS

BODY OF THE APPLICATION

An object of the invention is to provide an installation for filling crate-like pallets with fruit, vegetables, or other products, agricultural or otherwise, that are easily damaged.

In the following, for purposes of simplification, the products handled will be designated only by the word "fruit", it being understood that, in each instance, this can include other products as mentioned above.

The object of the invention is to provide an installation which meters fruit into a pallet previously filled with an appropriate liquid, water for example, with a minimum of handling and as rapidly as possible.

For this purpose, the installation according to the invention comprises in combination:

A roller bed for the pallets passing beneath a fruit feed unit to a position called the filling point; a tank arrangement of liquid-tight partitions disposed around the filling point, some of which, at least, are movable and may occupy, selectively, either an operative position in which they laterally close the filling point, or a non-operative position in which, on the other hand, they permit the passage of the pallets, moved empty to the filling point, or removed therefrom full; means for rapidly placing a predetermined volume of an appropriate liquid into the tank, means for flowing fruit into the tank to increase said volume, means for measuring the increase of volume in the tank, means responsive to the measuring means to stop the flow of fruit into the tank when the volume has been increased to a predetermined extent, and means for rapidly emptying the filling point of said liquid to enable the movable partitions to be retracted and the pallet, full of fruit, to be removed.

Further features and advantages of the invention will emerge from the following description and from examination of the attached drawings, which illustrate schematically and by way of example one form of construction of an installation in accordance with the invention for filling pallets with fruit or other easily damaged products.

FIG. 3 is a front elevation view taken along line 3—3 of FIG. 1;

FIG. 4 is an enlarged partially sectional, side elevation view taken along line 4—4 of FIG. 3; and FIG. 5 is an enlarged vertical sectional view taken along line 5—5 of FIG. 4.

Figure 1:
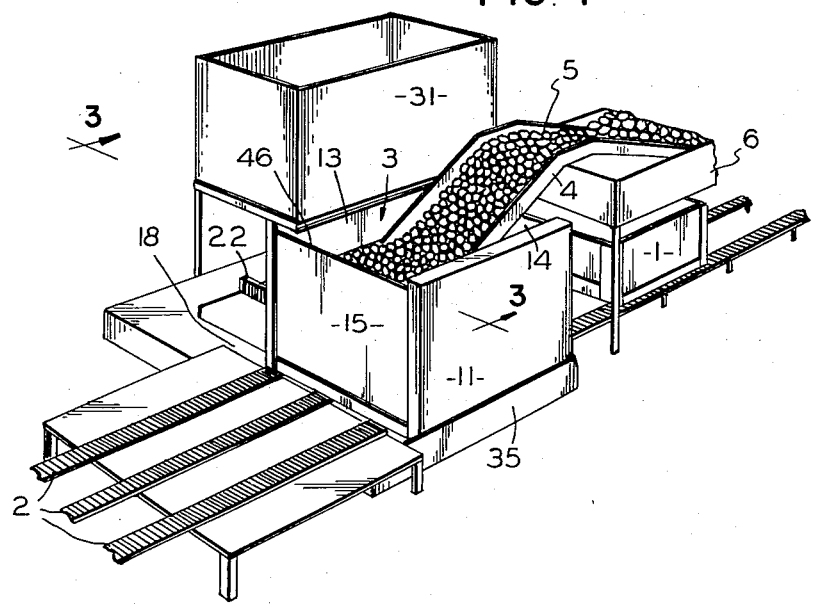
FIG. 1 shows a three-quarter front perspective view of the general arrangement of the installation in a position in which a pallet is being filled.

An installation for effecting a method forming one embodiment of the invention to meter fruit or other easily damaged products into article receiving containers in the form of pallets 1, comprises a horizontal roller 2 which pass through a position designated by 3 which is called, in the following, the filling point; this point is located below the downstream end of a roller elevator 4 adapted to pick up fruit 5 floating in a supply vat 6.

Located at the filling point 3 is a water metering column-like chamber or tank 11 forming a first vertical partition, parallel with the roller bed 2; the partition defined by the tank 11 constitutes one of four faces of a laterally opening filling tank, the other three faces being constituted, respectively, by a vertical wall 13, parallel with the wall 11, and two other vertical side walls 14 and 15 at right angles to the other two; the assembly comprising the three partitions 13, 14 and 15 can be moved as a whole on two parallel horizontal slides 18 at right angles to the direction of the roller bed 2. Hereafter, the assembly constituted by the three partitions 13, 14 and 15 will be referred to as the moving part of the filling tank, the partition 11 constituting the fixed part of said tank.

In the embodiment illustrated, the moving part of the filling tank can be displaced on the slides 18 by means of a mechanical control system which comprises a fixed rack 22 engaged by a pinion not shown) driven by an electric motor (not shown) mounted on said moving part of the filling tank, through any suitable conventional transmission means. This structure is disclosed in French Pat. No. 1,416,318. Other control systems than that disclosed which includes the rack and pinion may, of course, be used. For example, a fluid pressure cylinder drive may be used in place of the rack and pinion.

Figure 2:
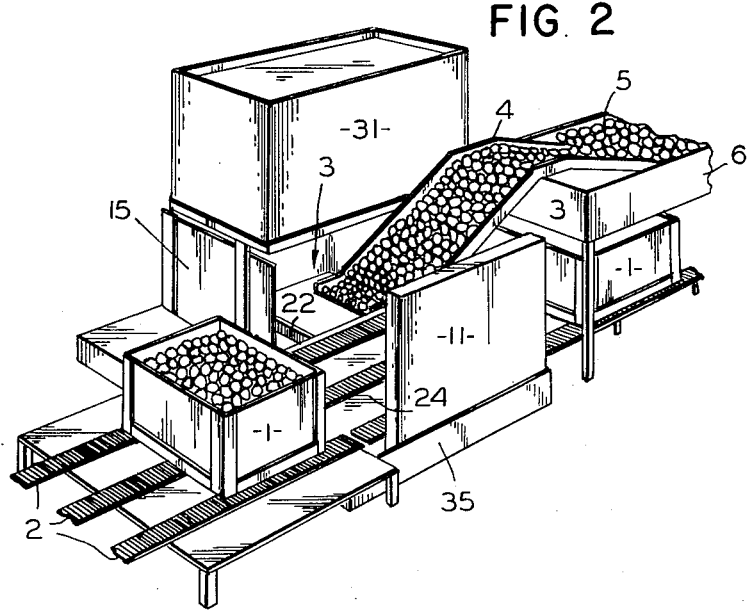
FIG. 2 is a view similar to that of FIG. 1, showing the installation in the position ready for the placing of an empty pallet at the filling point.

This moving part of the filling tank may occupy the non-operative position shown in FIG. 2 in which it is spaced away from the fixed partition 11 and it allows free passage of the pallets 1 which are passed empty to the filling point 3 or are removed therefrom when full. Another position of the moving part of the tank — operative position — is illustrated in FIG. 1, the free edges of the two lateral partitions 14 and 15, fitted with sealing means, are then applied to the inner face of the wall 11 so that the tank assembly, of general parallelepiped form, thus constituted, forms, together with the bottom 24 of the filling point, an enclosed space or filling tank adapted to receive in succession, and one at a time, the pallets to be filled with fruit; into this enclosed space can be released a predetermined volume of liquid, water in particular, necessary to fill it so as to enable fruit to be deposited in the pallet without dropping any appreciable distance.

As it is clearly useful, for the purpose of obtaining a good operating rhythm, to fill this space as rapidly as possible, and since it is desirable to avoid the use of a pump having too great a delivery rate, and consequently prohibitive dimensions and force, there is provided in the present installation, alongside the downstream end of the roller elevator 4 and above the filling post, a rapid supply reservoir or tank 31 which is filled with liquid while a pallet is being filled with fruit, this filling operation being achieved by means of an automatically primed pump 32 driven by an electric motor 33; the suction side of this pump is connected to a discharge reservoir 35, positioned below the filling point 3. The delivery of this pump then simply has to be sufficient to fill the supply reservoir during the pallet-filling cycle.

FIG. 4 shows the suction pipe 37 of the pump connected to the discharge reservoir 35 and the delivery pipe 36 connected to the rapid supply reservoir 31. The pallet fits closely within the filling tank so that after the tank has been emptied of water the fruit falls back into said pallet. The lower edges of the two movable side walls 14 and 15 carry skirt elements 46 adapted to guide the water from the filling point into the discharge reservoir 35 at the moment when the filling point is emptied.

Since the fruit deposited in a pallet causes overspill of a corresponding quantity of liquid, in the form of construction illustrated, the quantity of water thus expelled, or at least a fraction of it, is used to provide a measure of the quantity of fruit deposited in the pallets. For this purpose the partition 11 is hollow and defines a measuring receptacle or small area column fed at its upper part by a supply means 50 (FIGS. 4 and 5).

The supply means 50 includes a horizontal overflow edge 52 formed by the bottom of an overflow opening 54 in a partition wall 56. The overflow water travels over the edge 52, under an equalizing vertical baffle 58 in a trough 59 and having a horizontal lower edge 60 and extending the entire length of the tank. The water flows out of the trough 59 over upper, horizontal overflow edge 61 of the trough and upper, horizontal overflow edge 63 of an inclined trough-like divider 64. The fraction of the water flowing over the edges 61 which is to the right of the divider 64, as viewed in FIG. 4, drops into receptacle or column-forming chamber 65, and is measured to measure the displacement of water from the tank by the fruit. The rest of the water overflowing the edges 61 and 63 drops either directly into passage 68 leading to the pump tank or chamber 35 or into the trough-like divider 64 which has an inclined bottom 67 along which it flows to an inclined plate 70 which guides it to the passage 68. The divider 64 has hook-like slide portions 72 and 74 slidable along edges 61 and 76 of walls 56 and 78. The divider is slid to the position desired to permit a predetermined fraction of the water overflowing from the tank to flow into the metering chamber 65.

The water in the metering tank raises to raise a float 80 (FIGS. 4 and 5) to a position actuating a switch 82 vertically adjustable on the wall 78. The switch 82, actuated by accumulation of a predetermined quantity of water in the metering tank 65, immediately actuates controls to stop the conveyor 4, retract the walls 13, 14 and 15, lift valve member 84 to discharge water from the metering tank 65 into the pump tank 35. The water from the filling tank 24 and the fruit filled pallet then drains into the pump tank 35, and the conveyor 2 carries the fruit filled pallet out of the filling tank and positions the next empty pallet in the filling tank. Then the walls 13, 14 and 15 are moved back to again close the filling tank. Meanwhile, the pump 32 (FIG. 3) has been started by actuation of the switch 82 (FIG. 4) and has filled the supply tank 31 with a predetermined quantity of water, the tank having a float controlled switch (not shown) to stop the pump when the desired quantity of water has been supplied thereto. Closure of the filling tank then actuates a discharge valve of the supply tank to again rapidly fill the tank, and to restart the conveyor 4 to supply fruit to the filling tank. The valve member 84 has dropped automatically to a closed position when the metering tank 65 has emptied. The operation described above then is repeated.

It would be possible for a pump of the type of pump 32, but have a very great delivery rate, to deliver water directly to the filling point, and to dispense with the rapid supply reservoir 31.

I claim:
1. The method of filling containers comprising:
   filling a tank and article-receiving container in the tank with a predetermined quantity of liquid and a portion of a predetermined quantity of articles,
   continuing to flow articles into the tank to overflow liquid from the tank,
   continuously placing a predetermined fraction of the liquid overflowing in a column of small horizontal cross-section,
   continuously measuring the height of the column to ascertain when a predetermined volume of liquid has been overflowed,
   and stopping the flow of articles into the tank when said predetermined volume of liquid has been overflowed.

2. The method of filling containers with articles comprising:
   placing a predetermined quantity of liquid in the tank,
   flowing articles into the tank to gradually displace the liquid to gradually increase the volume,
   overflowing at least a portion of the liquid displaced by the articles,
   measuring a fraction of the overflowed liquid to determine the increase in volume,
   and stopping the flow of articles to the tank when the volume has increased a predetermined extent.

3. The method of filling containers comprising:
   placing a predetermined quantity of liquid and a portion of a predetermined quantity of articles into a tank container having an article container therein,
   continuing to flow articles into the tank and container to cause the liquid to overflow the tank,
   taking a fraction of the overflow,
   varying the fraction taken of the overflow in relation to the size of the articles,
   measuring said predetermined fraction,
   and stopping the flow of articles into the container when a predetermined quantity of liquid has been displaced by the articles.

4. The method of filling containers with articles comprising:
   filling with liquid and a portion of a predetermined, filling quantity of articles a tank having a horizontal overflow edge of a predetermined length,
   continuously adding articles to the tank to continuously overflow liquid over said edge,
   continuously vertically dividing the flow over said edge into a known larger fraction and a known lesser fraction,
   continuously directing said lesser fraction into a column-like metering chamber,
   and stopping the flow of articles to the tank when the level of liquid in the chamber reaches a predetermined height.

5. In combination,
   a filling tank,
   liquid supply means for supplying a predetermined quantity of liquid to said tank,
   article supply means for flowing articles into the tank to displace the liquid proportionally to the quantity of food products supplied to said tank, dividing means for separating a predetermined fraction of said increase in apparent volume, measuring means for measuring said predetermined fraction, and means responsive to said measuring means for stopping said article supply means.

6. The combination of claim 5 wherein said control means includes means forming said fraction into a column.

7. The combination of claim 5 wherein said control means includes overflow means for directing said apparent increase in volume to said dividing means.

8. The combination of claim 5 wherein said overflow means comprises an overflow edge and said divider comprises a deflector slidable along said edge.

* * * * *